United States Patent
Chaudhuri et al.

(10) Patent No.: US 8,398,856 B2
(45) Date of Patent: Mar. 19, 2013

(54) SELF-SUSTAINED MICROBIAL DETOXIFICATION OF SOLUBLE SULFATE FROM ENVIRONMENTAL EFFLUENT

(75) Inventors: Shaon Ray Chaudhuri, Kolkata (IN); Ashoke Ranjan Thakur, Kolkata (IN)

(73) Assignee: West Bengal University of Technology, Kolkata (IN)

( * ) Notice: Subject to any disclaimer, the term of this patent is extended or adjusted under 35 U.S.C. 154(b) by 0 days.

(21) Appl. No.: 13/380,767

(22) PCT Filed: Jul. 28, 2011

(86) PCT No.: PCT/IB2011/001743
§ 371 (c)(1), (2), (4) Date: Dec. 23, 2011

(87) PCT Pub. No.: WO2012/168754
PCT Pub. Date: Dec. 13, 2012

(65) Prior Publication Data
US 2012/0312743 A1 Dec. 13, 2012

(30) Foreign Application Priority Data
Jun. 10, 2011 (IN) .............................. 789/KOL/2011

(51) Int. Cl.
*C02F 3/00* (2006.01)
(52) U.S. Cl. ......... 210/610; 210/611; 210/615; 210/616
(58) Field of Classification Search .......... 210/610–611, 210/615–616
See application file for complete search history.

(56) References Cited

U.S. PATENT DOCUMENTS

| 5,506,123 A | 4/1996 | Chieffalo et al. |
| 5,635,368 A | 6/1997 | Lommi et al. |
| 6,420,164 B1 | 7/2002 | Eccles et al. |

FOREIGN PATENT DOCUMENTS

CN 101353636 1/2009

OTHER PUBLICATIONS

Adarsh, V.K. et al., "Studies on Metal Microbe Interaction of Three Bacterial Isolates From East Calcutta Wetland," OnLine Journal of Biological Sciences, 2007, vol. 7, pp. 80-88.
Al-Zuhair, S. et al., "Sulfate inhibition effect on sulfate reducing bacteria," J. Biochem. Tech., 2008, vol. 1, No. 2, pp. 39-44.
Barker, S.B. et al., "The colorimetric determination of lactic acid in biological material," J. Biol. Chem., 1941, vol. 138, pp. 535-554.
Bull, K.R. et al., "Coordinated effects monitoring and modelling for developing and supporting international air pollution control agreements," Water, Air, and Soil Pollution, 2001, vol. 130, pp. 119-130.
Chaudhuri, S.R. et al., "Microbial DNA extraction of samples of varied origin," Current Science, Dec. 25, 2006, vol. 91, No. 12, pp. 1697-1700.

(Continued)

*Primary Examiner* — Chester Barry
(74) *Attorney, Agent, or Firm* — Foley & Lardner LLP (57) ABSTRACT

Systems and methods for the bioremediation of soluble sulfates from an environmental effluent, include a first chamber including lactic acid bacteria immobilized on a first matrix and a second chamber including sulfate-reducing bacteria immobilized on a second matrix. The methods include providing the lactic acid bacteria a suitable medium for the production of lactic acid, which is directed to the culture of sulfate-reducing bacteria for use as a substrate/electron donor for the reduction of sulfates present in the environmental effluent.

37 Claims, 4 Drawing Sheets

OTHER PUBLICATIONS

Chaudhuri, S.R. et al., "Microbial genetic resource mapping of East Calcutta Wetlands," Current Science, Jul. 25, 2006, vol. 91, No. 2, pp. 212-217.

Chowdhury, S. et al., "Novel Metal Accumulator and Protease Secretor Microbes from East Calcutta Wetland," American Journal of Biochemistry and Biotechnology, 2008, vol. 4, pp. 255-264.

Doshi, S.M., "Bioremediation of Acid Mine Drainage Using Sulfate-Reducing Bacteria," U.S. Environmental Protection Agency-Office of Superfund Remediation and Technology Innovation, Aug. 2006, 72 pages.

Dumbrepatil, A. et al., "Utilization of molasses sugar for lactic acid production by *Lactobacillus delbrueckii* sub sp. delbrueckii mutant uc-3 in batch fermentation," Jan. 2008, vol. 74, No. 1, pp. 333-335.

Geurts, J. et al., "Sediment Fe:PO4 ratio as a diagnostic and prognostic tool for the restoration of macrophyte biodiversity in fens waters," Freshwater Biology, 2008, vol. 53, pp. 2101-2116.

Government of Saskatchewan, "Sulphate," Dec. 2003, printed on Dec. 14, 2011, retrieved from http://www.saskh2o.ca/PDF/sulphate%20FS.pdf, 2 pages.

Icgen, B. et al., "Exposure to sulfide causes populations shifts in sulfate-reducing consortia," Res. Microbiol., 2006, available online May 24, 2006, vol. 157, pp. 784-791.

International Search Report and Written Opinion for PCT/IB2011/001743 mailed Oct. 28, 2011.

Jong, T. et al., "Microbial sulfate reduction under sequentially acidic conditions in an upflow anaerobic packed bed bioreactor," Water Research, Jul. 2006, vol. 40, pp. 2561-2571.

Liamleam, W. et al., "Electron donors for biological sulfate reduction," Biotechnol. Adv., 2007, available online May 17, 2007, vol. 25, pp. 452-463.

Malathu, R. et al., "Characterization and Wash Performance Analysis of Microbial Extracellular Enzymes from East Calcutta Wetland in India," American J. of Appl. Sci., 2008, vol. 5, No. 12, pp. 1650-1661.

Nandy, P. et al., "Characterization of bacterial strains isolated through microbial profiling of urine samples," OnLine Journal of Biological Sciences, 2007, vol. 7, No. 1, pp. 44-51.

Nandy, P. et al., "Comparative study on characterization of three Staphylococcal isolates from varied origin," Journal of Culture Collections, 2008-2009, vol. 6, pp. 52-60.

Nasipuri, P. et al., "Comparative Study of Soluble Sulfate Reduction by Bacterial Consortia from Varied Regions of India," American Journal of Environmental Sciences, 2010, vol. 6, No. 2, pp. 152-158.

Pal, V. et al., "Isolation and characterization of bacteriocin producing lactic acid bacteria from a south Indian special dosa (appam) batter," Journal of Culture Collections, 2004-2005, vol. 4, pp. 53-60.

Patel, M.A. et al., "Isolation and Characterization of Acid-Tolerant, Thermophilic Bacteria for Effective Fermentation of Biomass-Derived Sugars to Lactic Acid," Applied and Environmental Microbiology, May 2006, vol. 72, No. 5, pp. 3228-3235.

Pickett, et al., "Using Biology to Treat Selenium," Power-Gen Worldwide, Nov. 1, 2006, printed Feb. 14, 2011, retrieved from http://www.power-eng.com/articles/print/volume-110/issue-11/features/using-biology-to-treat-selenium.html, 3 pages.

Preez, L.A.d. et al., "Pilot-scale biological sulphate and nitrate removal utilizing producer gas as energy source," Water Science and Technology, printed on Dec. 14, 2011, retrieved from http://bvs.per.paho.org/muwww/fulltext/repind54/pilot/pilot.html, 12 pages.

Roy, S. et al., "Isolation and characterization of novel metal accumulating extracellular protease secreting bacteria from marine coastal region of Digha in West Bengal, India," OnLine Journal of Biological Sciences, 2008, vol. 8, No. 1, pp. 25-31.

Sarkar, A.D. et al., "Microbial Biodiversity Screening for Metal Accumulators from Mineral Ore Rich Site in Andhra Pradesh, India," OnLine J. of Bio. Sci., 2008, vol. 8, No. 2, pp. 32-40.

Shin, H.S. et al., "Influence of sulfur compounds and heavy metals on the methanization of tannery wastewater," Water Sci. Technol., 1997, vol. 35, No. 8, pp. 239-245.

Soomro, A.H. et al., "Role of Lactic Acid Bacteria (LAB) in Food Preservation and Human Health," Pakistan Journal of Nutrition, 2002, vol. 1, No. 1, pp. 20-24.

Sybsema, W. et al., "Safe use of genetically modified lactic acid bacteria in food. Bridging the gap between consumers, green groups, and industry," Electronic Journal of Biotechnology, Jul. 15, 2006, vol. 9, No. 4, pp. 424-448.

Todorov, S.D. et al., "Bacteriocin production by Pediococcus pentosaceus isolated from marula (*Scerocarya birrea*)," International Journal of Food and Microbiology, 2009, vol. 132, pp. 117-126.

Tsuneda, et al., "Removal of Low-Concentration Heavy Metals Using Fibrous Slag as Biocarrier and Particle Collector," Journal of Japan Society on Water Environment, 2005, vol. 28, No. 11, pp. 651-655 (with English abstract).

Van Reenen, C. A. et al., ". Isolation, purification and partial characterization of plantaricin 423, a bacteriocin produced by *Lactobacillus plantarum*," Journal of Applied Microbiology, 1998, vol. 84, pp. 1131-1137.

Yang, R. et al., "Novel method to extract large amounts of bacteriocins from lactic acid bacteria," Applied and Environmental Microbiology, Oct. 1992, vol. 58, No. 10, pp. 3355-3359.

Zak, D. et al., "Sulphate-mediated phosphorus mobilization in riverine sediments at increasing sulphate concentration, River Spree, NE Germany," Biogeochemistry, 2006, vol. 80, pp. 109-119.

Zhou, S. et al., "Production of Optically Pure D-Lactic Acid in Mineral Salts Medium by Metabolically Engineered *Escherichia coli* W3110," Applied and Environmental Microbiology, Jan. 2003, vol. 69, No. 1, pp. 399-407.

SELF-SUSTAINED MICROBIAL DETOXIFICATION OF SOLUBLE SULFATE FROM ENVIRONMENTAL EFFLUENT

CROSS-REFERENCE TO RELATED APPLICATIONS

This application is a U.S. national stage application of International Application No. PCT/IB2011/001743, filed on Jul. 28, 2011, which in turn claims the benefit of India Patent Application 789/KOL/2011, filed on Jun. 10, 2011, the entire contents of which are incorporated herein by reference for all purposes, in their entireties.

TECHNICAL FIELD

The present technology relates generally to methods and systems for the bioremediation of an environmental effluent. In particular, the present technology relates to the reduction of soluble sulfates present in the effluent by sulfate-reducing bacteria.

BACKGROUND

Sulfate contamination in ground water has increased in recent decades due to various human activities. Effluent water from mines release huge amounts of sulfate to the environment, making the water unsuitable for discharge into the environment or for human use. Also, the lowering of ground water tables due to agricultural use causes oxygen to invade the anoxic layer, oxidizing the iron sulfides to Fe(III) hydroxides and generating sulfate. This leaches to the ground water leading to an increase in sulfate concentration. Sulfate also leaches into water supplies from sources like decaying plants and animals; and from chemicals used in the agricultural, textile, and manufacturing industries.

Sulfate contamination of ground water causes many human health hazards. Consumption of water with more than 500 mg/L of sulfate causes a laxative effect, leading to intestinal discomfort, diarrhea, and eventually leading to dehydration. Also, the presence of sulfate salts in the range of 250 to 1000 mg/L imparts unpleasant taste to the water. It has also been reported that sulfate pollution can lead to eutrophication of surface water and increase the corrosive property of the water.

Methods of reducing sulfate contamination include demineralization by reverse osmosis, distillation, or precipitation using chemicals like barium. However, demineralization is prohibitively expensive for use on an industrial scale. Also, while chemical reduction of sulfate using barium chloride also ensures substantial reduction of heavy metals, the extremely high levels of barium chloride necessary for effective remediation of sulfates renders the method unfeasible on an industrial scale.

Bioremediation is an alternative treatment option for reducing sulfate concentrations in ground water. However, treatment of soluble sulfate from waste water using sulfate reducing bacterial (SRB) consortia has limits. For example, a continuous supply of SRB must be maintained, and the bacteria require a continuous supply of a substrate/electron donor to support the reduction of sulfates. While lactic acid is a highly effective substrate for SRB, there is a significant cost associated with running a reactor using commercially available lactic acid.

SUMMARY

Provided herein are methods and systems for self-sustained sulfate bioremediation. The system includes an immobilized culture of lactic acid bacteria (LAB) for the production of lactic acid that serves as a substrate/electron donor for dissimilatory sulfate reduction by a separate culture of SRB. Use of an internal lactic acid source to support SRB-mediated sulfate reduction eliminates the need for commercial lactic acid, substantially reducing the cost of large-scale sulfate bioremediation.

In one aspect, a system is provided for the removal of soluble sulfates from water. Generally, the system includes a first chamber including a culture of lactic acid bacteria (LAB) immobilized on a first matrix, and a second chamber including a culture of sulfate-reducing bacteria (SRB) immobilized on a second matrix. In illustrative embodiments, the first chamber is in fluid communication with the second chamber. In some embodiments, the first chamber is configured to receive a first culture medium alone or in combination with an environmental effluent and release a first discharge effluent to the second chamber. In illustrative embodiments, the second chamber is configured to receive the first discharge effluent alone or in combination with an environmental effluent and release a second discharge effluent. In illustrative embodiments, the environmental effluent includes sulfate, and the second discharge effluent has a reduced sulfate concentration compared to the environmental effluent.

In one aspect, a method is provided for removing sulfates from an environmental effluent. In illustrative embodiments, the method includes directing a first culture media alone or in combination with an environmental effluent including sulfates to a first chamber including a culture of lactic acid bacteria (LAB) immobilized on a first matrix, wherein the lactic acid bacteria metabolize components of the culture medium and/or environmental effluent and produce lactic acid, and wherein the first chamber releases a first discharge effluent. In illustrative embodiments, the method also includes directing the first discharge effluent from the first chamber alone, or in combination with an environmental effluent, to a second chamber including a culture of sulfate-reducing bacteria (SRB) immobilized on a second matrix, wherein the sulfate-reducing bacteria metabolize the lactic acid present in the first discharge effluent and reduce sulfates present in the first discharge effluent or environmental effluent to produce a second discharge effluent. In illustrative embodiments, the method also includes releasing the second discharge effluent from the second chamber, wherein the second discharge effluent includes a reduced sulfate concentration compared to the environmental effluent.

In illustrative embodiments, the second chamber includes SRB culture media components suitable for the growth, maintenance, or both, of the sulfate-reducing bacteria in addition to the first discharge effluent. In illustrative embodiments, the lactic acid bacteria are incapable of growth under the conditions maintained in the second chamber. In illustrative embodiments, the lactic acid bacteria and the sulfate-reducing bacteria are pure populations of bacteria. In illustrative embodiments, the lactic acid bacteria and the sulfate-reducing bacteria are mixed populations of bacteria.

In one aspect, a system is provided for the bioremediation of sulfates in an environmental effluent. In illustrative embodiments, the system includes a first chamber including a culture of lactic acid bacteria (LAB) immobilized on a first matrix and a second chamber including a culture of sulfate-reducing bacteria (SRB) immobilized on a second matrix. In illustrative embodiments, the first chamber is in fluid communication with the second chamber. In illustrative embodiments, the first chamber is configured to receive a first culture medium alone or in combination with an environmental effluent that includes sulphate, and direct a first discharge effluent to the second chamber. In illustrative embodiments, the second chamber is configured to receive the first discharge effluent alone or in combination with an environmental effluent and release a second discharge effluent. In illustrative embodiments, the second discharge effluent includes a reduced sulfate concentration compared to the environmental effluent.

In illustrative embodiments, the first culture medium includes nutrients suitable for the growth, maintenance, or both of the lactic acid bacteria. In illustrative embodiments, the first discharge effluent includes lactic acid at a higher concentration than in the first culture medium or environmental effluent.

In illustrative embodiments, the second chamber includes SRB culture media components suitable for the growth, maintenance, or both of the sulfate-reducing bacteria. In illustrative embodiments, the lactic acid bacteria are incapable of growth under the conditions maintained in the second chamber.

In illustrative embodiments, the second discharge effluent has a sulfate concentration that is less than 90% of the sulfate concentration of the environmental effluent. In illustrative embodiments, the second discharge effluent has a sulfate concentration that is less than 1% of the sulfate concentration of the environmental effluent. In one embodiment, the second discharge effluent has a sulfate concentration of about zero.

In illustrative embodiments, the lactic acid bacteria include an indigenous strain, bacteria isolated from the intestine of species such as *Gibelion catla, Nibea* sp., *Labeo rohita, Raiamas bola, Puntius* sp., *Oreochromis niloticus, Heteropneutes fossilis, Sus scrofa domesticus, Gallus domesticus*, or *Capra aegagrus hircus*, or from fermented food, milk products, citrus and rotten fruit, leaves, long grass, and the like.

In illustrative embodiments, the sulfate-reducing bacteria include an indigenous consortium, including genera such as *Archaeoglobus, Desulfoarculus, Desulfobacter, Desulfobacterales, Desulfobacterium, Desulfobotulus, Desulfobulbus, Desulfococcus, Desulfomicrobium, Desulfomonile, Desulfonema, Desulfosarcina, Desulfotomaculum, Desulfovibrio, Desulfovibrionales, Syntrophobacterales, Thermodesulfobacterium, Thermodesulfovibrio*, and the like.

In illustrative embodiments, the lactic acid bacteria or the sulfate-reducing bacteria include pure populations of bacteria. In illustrative embodiments, the lactic acid bacteria or the sulfate-reducing bacteria include mixed populations of bacteria.

In illustrative embodiments, the first matrix, second matrix, or both the first matrix and second matrix, include a natural, synthetic, or semi-synthetic material. In illustrative embodiments, the first matrix, second matrix, or both the first matrix and second matrix, include hay, straw, husk, saw dust, wheat bran, rice bran, pulse bran, wood chips, plastic sheets, plastic o-rings, metal mesh, fiber mesh, alginate beads, or synthetic asbestos.

In illustrative embodiments, the first chamber and/or the second chamber include a cylinder. In illustrative embodiments, the first chamber and/or the second chamber include a corrugated sheet. In illustrative embodiments, the first chamber and/or second chamber include a cube.

The foregoing summary is illustrative only and is not intended to be in any way limiting. In addition to the illustrative aspects, embodiments, and features described above, further aspects, embodiments, and features will become apparent by reference to the following drawings and the detailed description.

BRIEF DESCRIPTION OF THE DRAWINGS

The foregoing and other features of the present disclosure will become more fully apparent form the following description and appended claims, taken in conjunction with the accompanying drawings. Understanding that these drawings depict only several embodiments in accordance with the disclosure and are not to be considered limiting of its scope, the disclosure will be described with additional specificity and detail through the use of the accompanying drawings.

DETAILED DESCRIPTION

The embodiments described in the detailed description and claims are illustrative only and are not intended to be limiting. Other embodiments may be used and changes may be made without departing from the scope of the subject matter presented here. It will be readily understood that the aspects of the present disclosure, as generally described herein can be arranged, substituted, combined, and designed in a wide variety of different configurations, all of which are explicitly contemplated and incorporated into this disclosure.

The definition of certain terms used herein are provided below. Unless defined otherwise, all technical and scientific terms used herein have the same meaning as commonly understood by one of ordinary skill in the art to which the present disclosure pertains.

As used herein, the singular forms "a," "an," and "the" include plural referents unless the context clearly indicates otherwise. For example, reference to "a bacteria" or "the bacteria" includes a combination of two or more bacteria, and the like.

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

As used herein, "bioremediation" refers to the use of microorganisms to remove environmental contaminants Bioremediation methods may be performed in situ, wherein contaminated material is treated at its original site, or ex situ, wherein contaminated material is removed from its original site and treated elsewhere.

As used herein, "dissimilatory reduction" refers to the reduction of a substance as a terminal electron acceptor in an electron transport chain. Dissimilatory reduction is distinguished from assimilatory reduction, which relates to the reduction of substances in the course of nutrient uptake.

As used herein, "lactic acid bacteria" and "LAB" refer to a group of gram-positive, acid-tolerant, generally non-sporulating, non-respiring bacteria that produce lactic acid as the metabolic end product of carbohydrate fermentation. The bacteria are found in decomposing plant and lactic products. Illustrative bacterial genera include, but are not limited to, *Lactobacillus, Leuconostoc, Pediococcus, Lactococcus, Streptococcus, Aerococcus, Carnobacterium, Enterococcus*,

*Oenococcus, Sporolactobacillus, Tetragenococcus, Vagococcus, Atopobium,* and *Weisella*. Illustrative sources of lactic acid bacteria isolates include, but are not limited to, the intestine of species such as *Gibelion catla, Nibea* sp., *Labeo rohita, Raiamas bola, Puntius* sp., *Oreochromis niloticus, Heteropneutes fossilis, Sus scrofa domesticus, Gallus domesticus,* or *Capra aegagrus hircus*, or fermented food, milk products, citrus and rotten fruit, leaves, long grass, and the like.

As used herein, "sulfate-reducing bacteria" and "SRB" refer to bacteria and archaea that obtain energy from the oxidation of organic compounds or molecular hydrogen while reducing sulfates to sulfides, especially to hydrogen sulfide. Bacterial genera including sulfate-reducing bacteria include, but are not limited to, *Archaeoglobus, Desulfoarculus, Desulfobacter, Desulfobacterales, Desulfobacterium, Desulfobotulus, Desulfobulbus, Desulfococcus, Desulfomicrobium, Desulfomonile, Desulfonema, Desulfosarcina, Desulfotomaculum, Desulfovibrio, Desulfovibrionales, Syntrophobacterales, Thermodesulfobacterium, Thermodesulfovibrio,* and the like.

As used herein, "indigenous consortium" or "indigenous consortia" refers to a population of bacteria native to the geographic area in which the methods or systems described herein are performed. Indigenous consortia may be isolated from plant or animal sources and may include pure populations or mixed populations of bacteria.

As used herein, "SRB culture media" refers to culture media suitable for the growth, maintenance, or both, of sulfate-reducing bacteria. Examples of SRB media include, but are not limited to, DSMZ Medium 641, as recommended by the Deutsche Sammhmg von Mikroorganismen and Zellkulturen GmbH (German Collection of Microorganisms and Cell Cultures). Illustrative SRB media includes, per liter: $NH_4Cl$ 1.0 g; $Na_2SO_4$ 2.0 g; Na-thiosulfate×$5H_2O$ 1.0 g; $MgSO_4$×$7H_2O$ 1.0 g; $CaCl_2$×$2H_2O$ 0.1 g; $KH_2PO_4$ 0.5 g; trace element solution SL-10 (below) 1.0 ml; vitamin solution (below), 10.0 ml; yeast extract 1.0 g; $NaHCO_3$ 2.0 g; Na-pyruvate 1.0 g; Na-malate 1.0 g; Resazurin 0.5 mg; $Na_2S$×$9H_2O$ 75.0 mg. The ingredients are dissolved in water (except trace elements, vitamins, bicarbonate, pyruvate, malate and sodium sulfide), boiled for 1 minute, cooled to room temperature, and dispensed into serum bottles. After autoclaving, the medium is completed by addition the remaining ingredients. The pH of the medium is adjusted to 7.0-7.2. Trace element solution SL-10 contains, per liter: HCl (25%; 7.7 M) 10.00 ml, $FeCl_2$×$4H_2O$ 1.50 g, $ZnCl_2$ 70.00 mg, $MnCl_2$×$4H_2O$ 100.00 mg, $H_3BO_3$ 6.00 mg, $CoCl_2$×$6H_2O$ 190.00 mg, $CuCl_2$×$2H_2O$ 2.00 mg, $NiCl_2$×$6H_2O$ 24.00 mg, $Na_2MoO_4$×$2H_2O$ 36.00 mg. Initially $FeCl_2$ is dissolved in the HCl, then diluted in water before the other salts are added. Vitamin solution contains, per liter: biotin 2.00 mg, folic acid 2.00 mg, pyridoxine-HCl 10.00 mg, thiamine-HCl×2 $H_2O$ 5.00 mg, riboflavin 5.00 mg, nicotinic acid 5.00 mg, d-ca-pantothenate 5.00 mg, vitamin $B_{12}$ 0.10 mg, p-aminobenzoic acid 5.00 mg, lipoic acid 5.00 mg.

As used herein, "environmental effluent" refers to waste water containing environmentally hazardous substances discharged into the environment. Examples of environmental effluents include, but are not limited to, contaminated ground water, effluent water from mining operations, effluent discharge from a treatment plant, sewer, or industrial pipe, and the like. As used herein, the term encompasses both treated and untreated water.

As used herein, "discharge effluent" refers to supernatants of the bacterial cultures described herein. The term "first discharge effluent" refers to the supernatant of the lactic acid bacteria of the first chamber. The first discharge effluent includes lactic acid produced by the lactic acid bacteria of the first chamber, and is directed to the second chamber. The term "second discharge effluent" refers to the supernatant of the sulfate-reducing bacteria of the second chamber. The second discharge effluent includes a reduced sulfate concentration compared to the that of the first discharge effluent and the environmental effluent.

As used herein, "sulfate" refers to soluble salts of sulphuric acid including a polyatomic anion with the empirical formula $SO_4^{2-}$. Sulfates amenable to the methods and systems describe herein include all water soluble sulfates.

As used herein, "matrix" refers to any natural, synthetic, or semi-synthetic material to which bacteria described herein may adhere and which is compatible with the culture conditions describe herein. In illustrative embodiments, the matrix materials include natural, synthetic, or semi-synthetic materials. Illustrative natural matrix materials include, but are not limited to, hay, straw, husk, saw dust, wheat bran, rice bran, pulse bran, wood chips, natural asbestos, and alginate beads. Illustrative synthetic matrix materials include, but are not limited to, synthetic asbestos, synthetic rubber, Bakelite (polyoxybenzylmethylenglycolanhydride), neoprene, nylon, PVC, polystyrene, polyethylene, polypropylene, polyacrylonitrile, PVB, and silicone. Illustrative semi-synthetic matrix materials include, but are not limited to, vulcanized rubber, gun cotton, and cellulose diacetate. Matrix materials may take any form compatible with the specific culture conditions in use, such as sheets, o-rings, mesh, or beads.

In practicing the technology described herein, many conventional techniques of chemistry, biochemistry, and microbiology are used. These techniques are well-known in the art and are provided in any number of available publications, including *The Prokaryotes: Symbiotic Associations, Biotechnology, Applied Microbiology*, Martin, Ed., Springer (2006); *Bioremediation Protocols*, Vol. 2, Sheehan, Ed., Humana Press (1997); *Methods in Microbiology*, Vol. 19, Bergan, Ed., Elsevier Science (1984); Norris and Ribbons, *Methods in Microbiology*, Academic Press (1971).

Methods and systems are provided for the removal or bioremediation of sulfates in an environmental effluent. In general, the methods and systems described herein include a culture of lactic acid bacteria (LAB) immobilized on a matrix and a consortium of SRB immobilized on a matrix, wherein the immobilized LAB and SRB are maintained in separate bioreactors and wherein the bioreactors are in fluid communication. In general, the methods include providing the culture of LAB with a culture media suitable for the production of lactic acid, and further directing that lactic acid to the SRB consortium for use as a substrate/electron donor in the dissimilatory reduction of soluble sulfates in the environmental effluent.

In an illustrative embodiment, the systems described herein include a first chamber including a culture of LAB immobilized on a first matrix, and a second chamber including a culture of SRB immobilized on a second matrix. In illustrative embodiments, the first chamber is in fluid communication with the second chamber. The first chamber is configured to receive a first culture medium, alone or in combination with an environmental effluent including sulfate, and release a first discharge effluent. The first chamber further includes a first culture medium suitable for the growth and/or maintenance of LAB. The second chamber is configured to receive the first discharge effluent alone or in combination with an environmental effluent including sulfate and release a second discharge effluent. The second chamber further includes a second culture medium suitable for the growth and/or maintenance of SRB. In illustrative embodiments, the SRB media does not contain lactic acid.

In illustrative embodiments, the LAB of the first chamber metabolize carbohydrates present in the first culture medium and generate lactic acid such that the first discharge effluent includes a higher lactic acid concentration then the first culture medium or the environmental effluent. The first discharge effluent is directed to the second chamber. SRB of the second chamber use the lactic acid of the first discharge effluent as a substrate/electron donor for the dissimilatory reduction of sulfates present in the environmental effluent such that the second discharge effluent includes sulfates at a reduced concentration compared to the first discharge effluent and environmental effluent.

The sulfate concentration of the second discharge effluent may be monitored using methods known in the art. An illustrative method for measuring sulfate reduction is given in Example 1. In an illustrative embodiment, the second discharge effluent has sulfate concentration that is less than 90% that of the environmental effluent. In various embodiments, the second discharge effluent has sulfate concentration that is less than 50%, 25%, 10%, or 5% that of the environmental effluent. In an alternative embodiment, the second discharge effluent has sulfate concentration that is less than 1% that of the environmental effluent. In an ideal embodiment, the second discharge effluent has a sulfate concentration of about zero.

Any effluent including soluble sulfates may be subjected to such systems and methods as described above. Illustrative practices known to generate large amounts of soluble sulfate include, but are not limited to, mining operations, the use of ammonium sulfate fertilizer, the treatment of water with aluminium sulfate, the use of copper sulfate in textile dyeing, leather tanning, the combustion of fossil fuels, and industrial activities such as metal smelting. The methods may be carried out at the site of production of the environmental effluent (in situ) or the effluent may be removed to another location for treatment (ex situ).

The methods and systems are advantageous in the removal or bioremediation of sulfates from environmental effluents with respect to operational costs and efficiency. Immobilization of bacterial cultures on matrix materials reduces costs associated with continuous production of starter cultures. In the case of LAB, use of an immobilized culture improves the consistency of lactic acid production over time. Also, the internal production of lactic acid in the system eliminates the need for a commercial supply of lactic acid and substantially reduces the cost of SRB culture media. These features in particular make the methods and systems described herein feasible and cost-effective for large-scale operations.

Lactic Acid Bacteria (LAB)

The methods and systems described herein include LAB for the production of lactic acid, which serves as a substrate/electron donor for SRB in the dissimilatory reduction of sulfates. LAB produce lactic acid as the metabolic end product of carbohydrate fermentation. Illustrative genera that include LAB include, but are not limited to, *Atopobium, Bacillus, Streptococcus, Lactobacillus, Leuconostoc, Pediococcus, Lactococcus, Streptococcus, Aerococcus, Carnobacterium, Enterococcus, Oenococcus, Sporolactobacillus, Tetragenococcus, Vagococcus,* and *Weisella*.

LAB are grouped based on the metabolic pathway used for carbohydrate fermentation. Typically, LAB use one of two pathways. Under conditions of excess glucose and limited oxygen, homolactic LAB catabolize one mole of glucose in the Embden-Meyerhof-Parnas (EMP) pathway to yield two moles of pyruvate. Intracellular redox balance is maintained through the oxidation of NADH, concomitant with the reduction of pyruvate to lactic acid. Typically, homofermentive end products include greater than 85% lactic acid.

Heterofermentative LAB use the pentose phosphate pathway (aka pentose phosphoketolase pathway), in which one mole of glucose-6-phosphate is dehydrogenated to 6-phosphogluconate and decarboxylated to yield one mole of $CO_2$. The resulting pentose-5-phosphate is then cleaved to yield one mole of glyceraldehyde phosphate (GAP) and one mole of acetyl phosphate. GAP is further metabolized to lactate, and the acetyl phosphate reduced to ethanol. Typically, heterfermentive end products include 50% lactic acid, with substantial amounts of ethanol and $CO_2$.

Representative homolactic LAB genera include *Lactococcus, Enterococcus, Streptococcus, Pediococcus*, and group I lactobacilli such as *L. acidophilus, L. delbrueckii, L. helveticus*, and *L. salivarius*. Obligate heterofermentative LAB include *Leuconostoc, Oenococcus, Weissella*, and group III lactobacilli such as *L. brevis, L. buchneri, L. fermentum*, and *L. reuteri*. Facultatively homofermentive bacteria include group II *lactobacillus* such as *L. casei, L. curvatus, L plantarum*, and *L. sakei*. Both groups of LAB are compatible with the present methods.

The methods and systems described herein may optionally include a pure population of LAB or a mixed population. The methods may optionally include LAB of known identity acquired from an established source, or newly isolated LAB from an indigenous or other source. LAB strains may be isolated and characterized using methods known in the art. Illustrative sources of lactic acid bacteria isolates include, but are not limited to, the intestine of species such as *Gibelion catla, Nibea* sp.*, Labeo rohita, Raiamas bola, Puntius* sp.*, Oreochromis niloticus, Heteropneutes fossils, Sus scrofa domesticus, Gallus domesticus*, and *Capra aegagrus hircus*. LAB may also be isolated from fermented food, milk products, citrus and rotten fruit, leaves, long grass, and the like. An illustrative method for LAB isolation and characterization is provided in Example 1.

Selection of LAB strains(s) for use in the methods and systems will depend on a number of factors. The LAB should produce lactic acid at sufficient levels to sustain the immobilized SRB of the second chamber. LAB preferably produce lactic acid at levels ranging from at least 4.0% to at least 30% of the total titratable acid produced. Methods of testing LAB for levels of lactic are known in the art. An illustrative method for measuring bacterial production of lactic acid is given in Example 1.

In addition, LAB will be selected based on its capacity to support dissimilatory reduction of sulfates by SRB. Often, but not always, the capacity to support dissimilatory sulfate reduction will correlate with high levels of lactic acid production. As such, LAB should be characterized in this regard in addition to and irrespective of their levels of lactic acid production. Methods of measuring the capacity of LAB to support dissimilatory sulfate reduction are known in the art. An illustrative method is provide in Example 1.

In addition, LAB for the methods and systems may be selected such that the culture conditions maintained in the second chamber, including an immobilized SRB culture and SRB media, are not optimal the growth of the LAB. This characteristic will limit cross-contamination of the second chamber by free-floating LAB inadvertently included in the first discharge effluent. LAB may additionally be selected such that ambient growing conditions for the strain are similar to those of the SRB strain in use.

LAB culture conditions for the methods and systems described herein will depend on the precise strain(s) in use.

However, conditions generally include a media containing glucose, lactose, or an equivalent that may be converted to lactic acid. In illustrative embodiments, LAB are grown in Luria Bertani (LB) media with 1% dextrose. Bacteria may be grown at a temperature of 15° C. to 55° C., at an acidic to mild alkaline pH. Depending on the LAB strain in use, conditions may be aerobic, microaerophilic, or anaerobic. General methods for culturing LAB are known in the art. Illustrative LAB culture conditions are provided in Examples 1 and 2.

Production of lactic acid by the LAB in the first chamber may be monitored periodically using methods known in the art. The levels and efficiency of lactic acid production may be construed as indicative of the health of the LAB culture and the need to augment or replace the culture. Illustrative methods for measuring lactic acid in bacterial culture supernatant are provided in Example 1.

Sulfate-Reducing Bacteria (SRB)

The methods and systems include SRB for the dissimilatory reduction of sulfates from an environmental effluent. SRB are strict or facultative anaerobes that use sulfate as a terminal electron acceptor. The reduction of sulfates by SRB produces sulfides, especially hydrogen sulfide gas. Bacterial genera encompassing SRB include, but are not limited to, *Archaeoglobus, Desulfoarculus, Desulfobacter, Desulfobacterales, Desulfobacterium, Desulfobotulus, Desulfobulbus, Desulfococcus, Desulfomicrobium, Desulfomonile, Desulfonema, Desulfosarcina, Desulfotomaculum, Desulfovibrio, Desulfovibrionales, Syntrophobacterales, Themmodesulfobacterium, Thermodesulfovibrio*, and the like.

The methods and systems may optionally include a pure population of SRB or a mixed population. The methods may optionally include SRB of known identity acquired from an established source, or newly isolated SRB from an indigenous or other source. SRB strains may be isolated and characterized using methods known in the art. Illustrative sources of SRB isolates include, but are not limited to, waste water-fed fish ponds, marshy lands, hot springs, tannery effluents, and waste dumping grounds. In an illustrative embodiment, the SRB was isolated from the East Calcutta Wetland, Calcutta, India.

SRB culture conditions for the methods described herein will depend on the precise strain(s) in use. For all SRB, conditions must be strictly anaerobic and SRB media must be degassed with nitrogen. In the methods, the SRB media is prepared such that it lacks lactic acid. In an illustrative embodiment, the SRB media is DSMZ Medium 641, as recommended by the Deutsche Sammlung von Mikroorganismen and Zellkulturen GmbH (German Collection of Microorganisms and Cell Cultures), modified to be lactic acid deficient. SRB strains may be selected such that ambient growing conditions are similar to that of the LAB strain in use.

Reduction of sulfates by SRB in the second chamber may be monitored periodically using methods known in the art. The levels and efficiency of sulfate reduction may be construed as indicative of the health of the SRB culture and the need to augment or replace the culture. An illustrative method for measuring sulfate reduction is given in Example 1.

System and Bioreactor Design

The systems include a first chamber and a second chamber, where the first chamber is in fluid communication with the second chamber. In general, first chamber is configured to receive a first culture medium, alone or in combination with an environmental effluent including sulfate, and to release a first discharge effluent. The second chamber is configured to receive the first discharge effluent, alone or in combination with an environmental effluent including sulfate and to release a second discharge effluent. In general, the system is designed such that there is a unidirectional flow of fluids from the first chamber to the second chamber.

The chambers described herein may optionally be constructed of acrylic, glass, or such other materials as are not corroded by lactic acid.

Figure 1A:
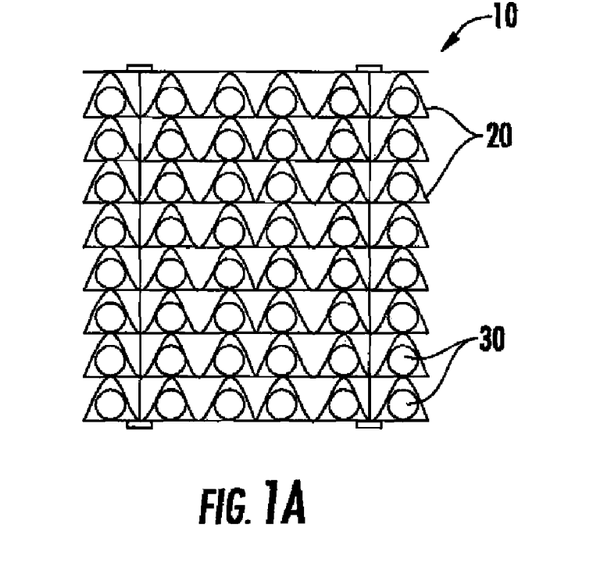
FIG. 1A is a diagram of corrugated sheets used in the corrugated sheet bioreactor design, according to one embodiment.
Figure 1B:
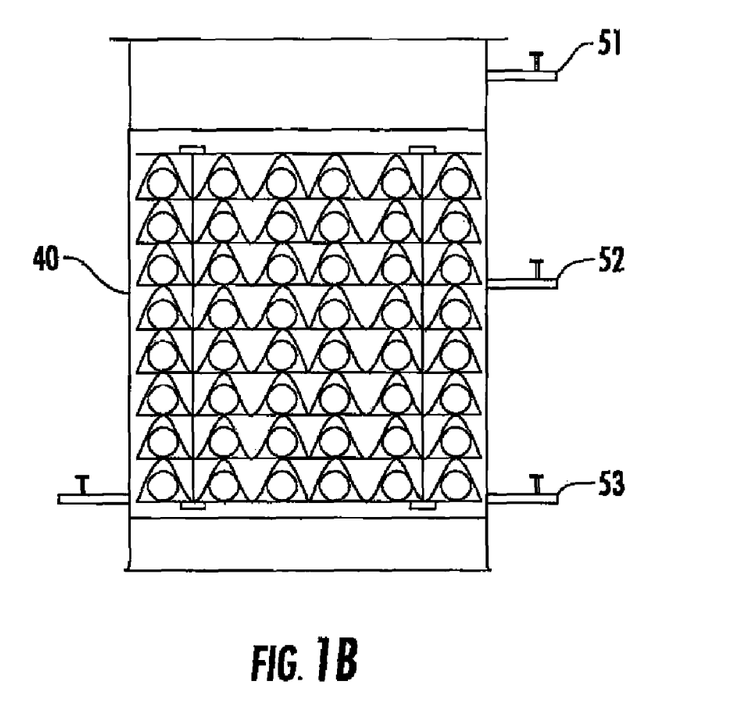
FIG. 1B is a diagram of a corrugated sheet bacterial growth chamber used in the corrugated sheet bioreactor design, according to one embodiment.

The first and second chambers may be of a suitable shape conducive to bacterial growth and maintenance, and in which flow of the effluents is efficiently controlled. Thus, in one embodiment, the first and/or second chambers are cylindrical. In other embodiments, the first and/or second chambers are cuboidal. In an alternative embodiment, the first and/or second chambers are corrugated sheets separated by a length of pipe. A corrugated sheet portion 10 of a reactor is illustrated in FIG. 1A. As generally described above, the corrugated sheet portion 10 includes sheets 20 that are separated by piping or doweling 30. The piping or doweling 30 separates the sheets 20 such that the sheets do not collapse upon one another, which would thereby prevent efficient contact of the sheets with fluids in the reactor. FIG. 1B is an illustration of the corrugated sheet portion 10 disposed within a reactor body 40. The reactor body 40 also includes two or more of valves 50, 51, 52, and 53. The valves may be inlet or outlet valves. In some embodiments, the flow of the effluents through the reactor is from bottom to top. In such an embodiment, valve 50 may be an inlet valve and valve 51 may be an outlet valve. In other embodiments, the flow of the effluent may be from bottom to top, and accordingly valve 51 may be the inlet valve and one or more of valves 51, 52, and 53 may be outlet valves. In yet other embodiments, the flow of effluent through the reactor may be in a cross-wise fashion with valve 51 as an inlet valve and valve 53 as an outlet valve. The exact flow design may be modified to suit different reactor systems and implementations.

Figure 2:
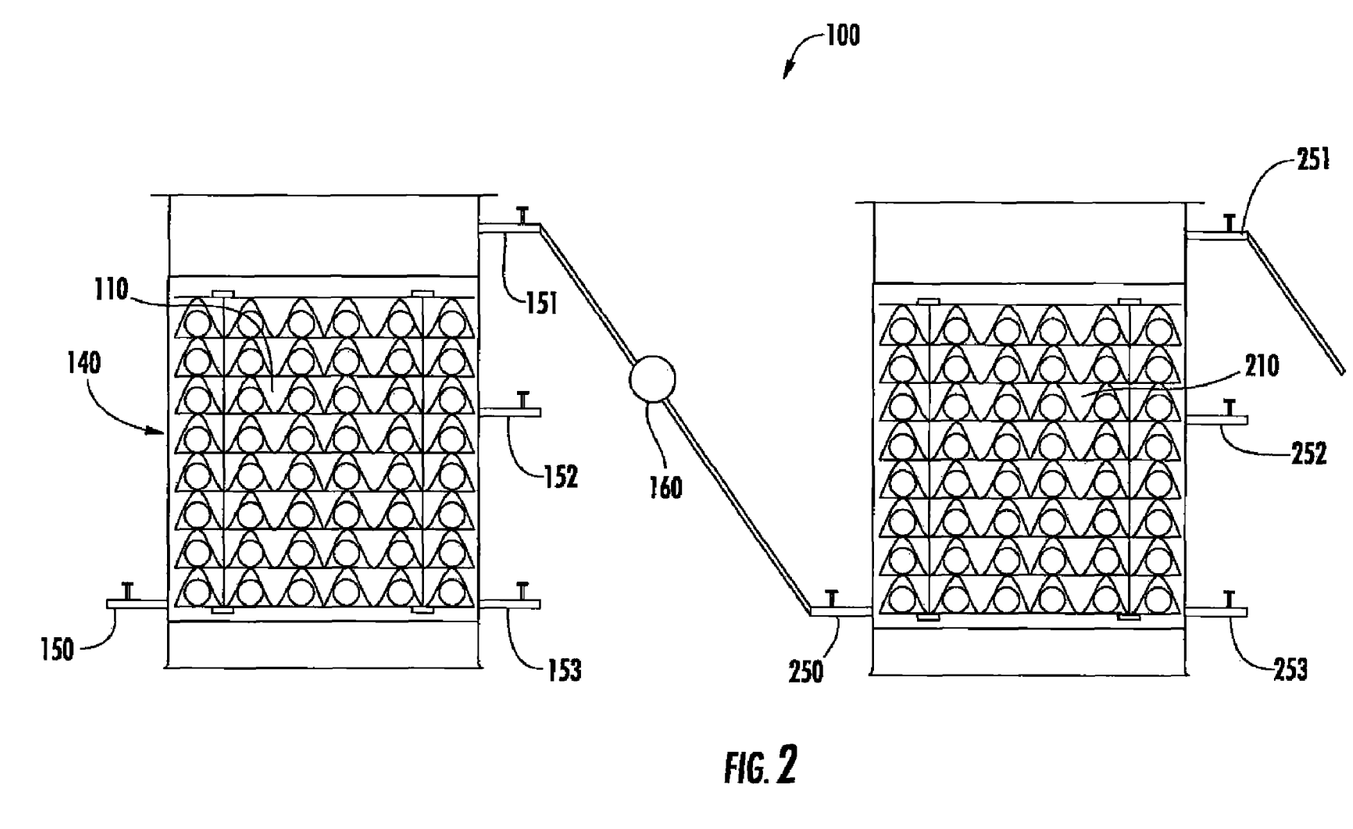
FIG. 2 is a diagram of a corrugated sheet bioreactor showing relative positions of a first and second reaction chamber having fluid communication between the chambers, through a pump, according to one embodiment.

FIG. 2 is an illustration of a reactor system 100 having an LAB reactor 140 and an SRB reactor 240. Each of the reactors 140, 240 are similar in structure to the model reactor described by FIG. 1. In FIG. 2 the reactor system 100 is illustrated to accommodate effluent flow from the bottom to top of the reactors. Effluent enters inlet valve 150 a travels upward through the corrugated sheet system 110 supporting immobilized LAB bacteria. The effluent then flows out of outlet valve 151 and pumped via pump 160 to SRB reactor 240. The effluent enters SRB reactor 240 via inlet valve 250, travelling upwards through the corrugated sheet system 210 and out outlet valve 251. The pump may be any as are known in the art. For example, the pump may be a peristaltic pump.

Figure 3:
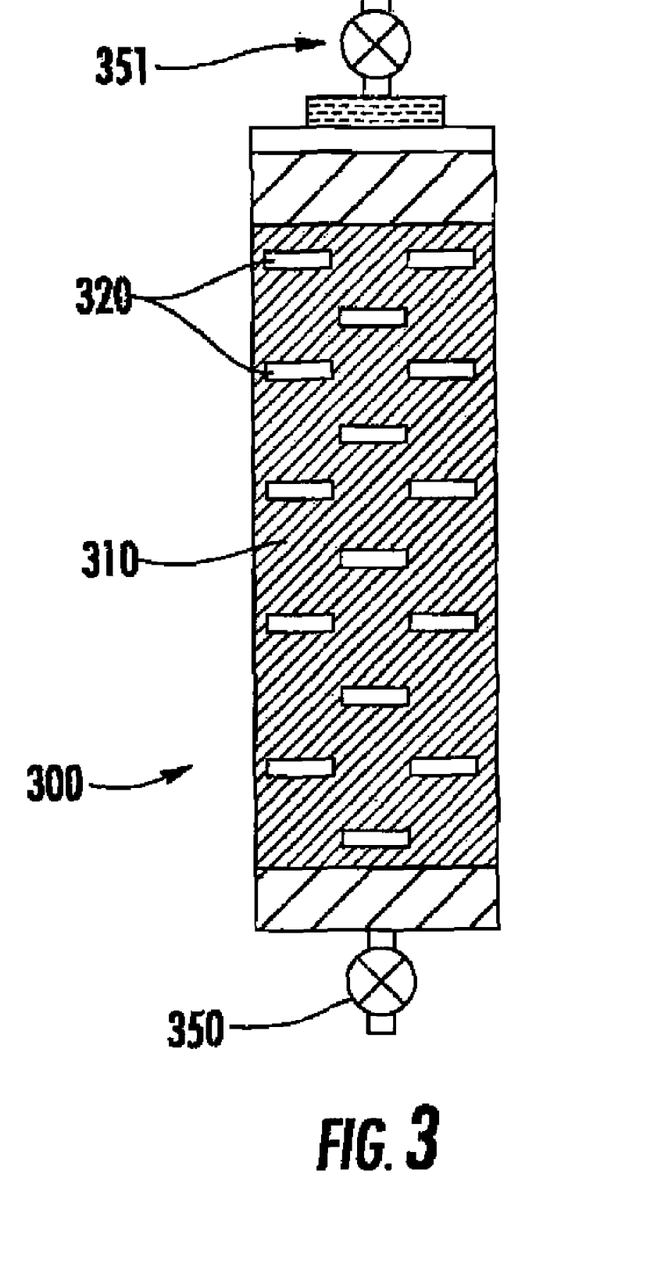
FIG. 3 is a diagram of a cylindrical bacterial growth chamber used the cylindrical bioreactor design.
Figure 4:
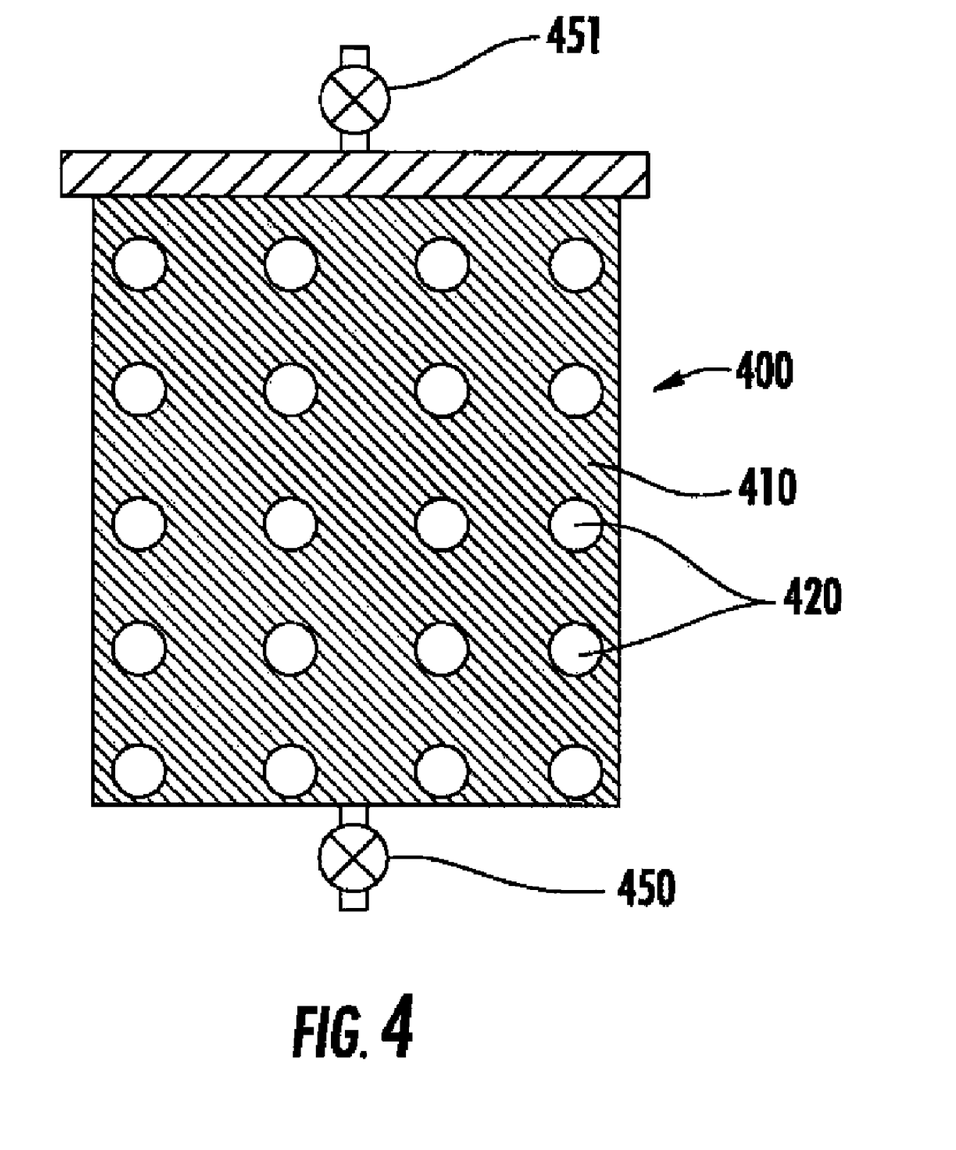
FIG. 4 is a diagram of a cuboidal bacterial growth chamber used in the cuboidal bioreactor design.

Other reactor designs are illustrated in FIGS. 3 and 4. In FIG. 3 a cylindrical reactor 300 is shown. The reactor 300 is packed with a matrix material 310 supporting the bacteria in the reactor. The matrix material also includes perforations 320 to allow for fluid movement and contact with and throughout the matrix material 310. Valves 350, 351 direct the effluent flow through the reactor 300. In FIG. 4, a cuboidal reactor 400 is shown. The reactor 400 is packed with a matrix material 410 supporting the bacteria in the reactor. The matrix material also includes holes 420, or perforations, to allow for fluid movement and contact with and throughout the matrix material 410. Valves 450, 451 direct the effluent flow through the reactor 400.

As noted above, the bacteria may be immobilized on a matrix material, such as the sheets of the corrugated system. The use of a matrix serves dual purposes of increasing the surface area within the chamber available for bacterial growth, and anchoring the bacteria such that they are not included in discharge effluents leaving the chambers. Any matrix material compatible with the disclosed methods may be used, and first and second matrix materials may be independently selected based on the conditions maintained in the first and second chambers. In illustrative embodiments, the matrix materials include natural, synthetic, or semi-synthetic materials. Illustrative natural matrix materials include, but are not limited to, hay, straw, husk, saw dust, wheat bran, rice bran, pulse bran, wood chips, natural asbestos, and alginate beads. Illustrative synthetic matrix materials include, but are not limited to, synthetic asbestos, synthetic rubber, bakelite (polyoxybenzylmethylenglycolanhydride), neoprene, nylon, PVC, polystyrene, polyethylene, polypropylene, polyacrylonitrile, PVB, and silicone. Illustrative semi-synthetic matrix materials include, but are not limited to, vulcanized rubber, gun cotton, and cellulose diacetate.

Matrix materials may take any three-dimensional form compatible with the specific culture conditions in use, including but not limited to sheets, o-rings, mesh, or beads. In illustrative embodiments, the matrix material is added to the chamber first, and the bacterial culture is added subsequently. In alternative embodiments, the matrix material is combined with the bacteria and then added to the chamber.

Selection of a particular matrix material will depend on the characteristics of the bacteria in use and the preferences of the operator. For example, the matrix material may be selected based on the capacity of a particular bacteria to adhere to it, or based on its expected shelf-life under the culture conditions in use.

EXAMPLES

The methods and systems disclosed herein are further illustrated by the following examples, which should not be construed as limiting in any way.

Example 1

Isolation and Characterisation of LAB Strains

Summary

Forty-five animal, plant, and food sources were tested for the presence of LAB. Aqueous samples of each source was cultured on Luria Bertani (LB) plates supplemented with calcium carbonate. Sixteen LAB strains were isolated and assayed for lactic acid production using a modified method of Barker and Summerson, 138 *J. Biol. Chem.* 535 (1941). Of the sixteen, three LAB isolates (Table 1) were further screened for their capacities to support soluble sulfate reduction by an SRB consortium obtained from the East Calcutta Wetland in Calcutta, India (Table 2). The LAB strain showing maximal support of SRB activity was characterized in detail using standard microbiological, biochemical, and molecular biological methods. The profile of the strain does not match that of any previously reported strain (Table 3).

A. Isolation of LAB Strains and Lactic Acid Measurement

The following 45 sources were tested for the presence of LAB strains: milk, cheese, fruit juice, sambar, chutni, sweet yogurt, sour yogurt, country liquor, idli batter, *Labeo rohita* (intestine), *Raiamas bola* (intestine), *Gibelion calla* (intestine), *Penaeus indicus* (flesh), probiotic (prowel), probiotic (Laviest), probiotic (Binifit), packet milk (pasteurized), pastry, buttermilk, mango pickle, chili pickle, pickle filler, *Solanum tuberosum*, *Solanum lycopersicum*, *Malus domestica* (juice), *Musa acuminata* (rotten), grapes (rotten), *Mangifera indica* (rotten), *Solanum melongena* (rotten), *Allium cepa*, *Oreochromis niloticus niloticus* (intestine), *Heteropneutes fossilis* (intestine), *Sus scrofa domesticus* (flesh), *Sus scrofa domesticus* (intestine), Charapona (intestine), *Puntius* sp. (intestine), *Gallus domesticus* (flesh), *Gallus domesticus* (intestine), *Capra hircus* (meat), *Capra hircus* (intestine), long grass, grass (shoot), bitter gourd grass, curry leaves, and tomato leaves. Small portions of each sample were mixed with sterile phosphate buffered saline (PBS). Leaf samples were sonicated for 14 minutes at maximum frequency. Samples were serially diluted to $1:1\times10^{-8}$ and 50 µl of each was spread on LB agar plates (1% tryptone, 0.5% yeast extract, 0.5% NaCl, 1% agar) containing 0.4% $CaCO_3$. Plates were cultured inverted overnight at 37° C. Lactic acid bacteria were identified by a clearing of the medium in a zone surrounding the colony. Sixteen LAB strains were isolated and assayed for lactic acid production using the following protocol, modified from Barker and Summerson (1941).

Reagents: The following reagents were used to measure lactic acid in bacterial culture supernatants: 20% solution of $CuSO_4.5H_2O$; 4% solution of $CuSO_4.5H_2O$; solid calcium hydroxide, powdered; sulfuric acid, concentrated, sp. gr. 1.84; 1.5% solution of p-hydroxydiphenyl in 0.5% NaOH.

Treatment with Copper and Calcium: LAB isolates were grown overnight in liquid LB media supplemented with 0.4% $CaCO_3$. 5.0 ml of cell-free filtrate was added to 1.0 ml of 20% copper sulfate solution, and the solution diluted with an additional 4.0 ml water. Approximately 1.0 g of powdered calcium hydroxide was added and the mixture was immediately shaken vigorously. The mixture was allowed to stand at room temperature for 0.5 hour, with occasional shaking, and then centrifuged at 9000 rpm for 10 minutes. The supernatant was used for the final color development as described below. In removing the aliquot for analysis, care was taken to avoid including any of the solid material present in the surface film. The aliquot was removed from beneath the surface film, and the outside of the pipette was wiped clean.

Color Development: 1.0 ml of the supernatant fluid from the copper-calcium treatment was transferred to a wide test-tube and 50 µl of 4% copper sulfate solution was added. Then 6.0 ml of concentrated sulfuric acid was added, mixing the contents of the tube while the acid is being added. After the addition of acid, the tube was placed upright in a boiling water bath for 5 minutes. The tubes were then removed and placed in cold water to decrease the temperature below 20° C. When the contents of the tube were sufficiently cool, 100 µl of the alkaline solution of p-hydroxydiphenyl was added. The precipitated reagent was dispersed as quickly and uniformly as possible throughout the solution, and the tubes were placed in a water bath at 30° C. for 30 minutes with occasional shaking. The tubes were then placed in boiling water bath for 90 seconds, removed, and allowed to cool in cold water until it attained room temperature. The 90 second heating in boiling water dissolves excess reagent, leaving a clear solution. The optical density (OD) at 590 nm was measured and the concentration determined with curves prepared using commercial lactic acids and lithium lactate separately.

Results: Lactic acid production by the sixteen LAB isolates is shown in Table 1. Production ranged from 4.51% to 29.84% of total titratable acid. Strain 10 produced highest percentage of lactic acid followed by strains 2 and 12. Based on their high levels of lactic acid production, strains 2, 10, and 12 were tested for their capacities to support soluble sulfate reduction by an SRB consortium (part B, below).

TABLE 1

The efficiency of lactic acid production by the three selected strains of LAB.

| Strain | Lactic acid (mM) | Total titratable acid (mM) | % lactic acid |
|---|---|---|---|
| 1 | 1.734 | 38.44 | 4.51 |
| 2 | 7.108 | 34.04 | 20.88 |
| 3 | 1.41 | 34.04 | 4.72 |
| 4 | 4.00 | 36.12 | 11.08 |
| 5 | 4.72 | 15.34 | 29.84 |
| 6 | 3.94 | 26.04 | 15.13 |
| 7 | 2.69 | 44.16 | 6.10 |
| 8 | 2.36 | 16.12 | 14.66 |
| 9 | 6.80 | 33.84 | 20.12 |
| 10 | 9.141 | 38.04 | 24.03 |
| 11 | 4.66 | 32.08 | 14.54 |
| 12 | 7.045 | 38.12 | 18.48 |
| 13 | 3.84 | 28.04 | 13.71 |
| 14 | 1.43 | 16.20 | 8.85 |
| 15 | 2.82 | 24.04 | 11.76 |
| 16 | 2.61 | 29.88 | 8.75 |

B. Capacity of LAB Isolates to Support Soluble Sulfate Reduction by SRB

LAB isolates 2, 10, and 12 were tested for their capacities to support soluble sulfate reduction by an SRB consortium obtained from the East Calcutta Wetland in Calcutta, India. The consortium uses sodium D-L lactate as an electron donor in the dissimilatory reduction of soluble sulfates and consists of 25 bacterial strains previously reported in Nasipuri, et al., 6 Am. J. Environ. Sci. 152 (2010). Partial 16S ribosomal RNA sequences for the strains are reported in GenBank Accession Nos. GQ503854-GQ503878.

LAB and SRB cultures were grown in a corrugated sheet bioreactor according to the design shown in FIG. 2. Cultures were maintained under ambient conditions (uncontrolled temperature, pH, anaerobicity) with an immobilization matrix of boiled hay. LAB were grown in LB media with 1% dextrose. SRB were grown in DSMZ Medium 641. A 1% inoculum of LAB or SRB was added to the respective medium and the immobilization matrix in the bioreactor was submerged for 12 hours. The culture was then drained and the matrix was allowed to dry for 6 hours to facilitate the adhesion of bacteria to the matrix. Fresh media was added to the bioreactors and the lactic acid production or the sulfate reduction was measured at 24 hours (Table 2). Sodium sulfate (2.0 g/L) and magnesium sulfate (1.0 g/L) were added to the SRB culture as sources of soluble sulfate. Sulfate was measured using a turbidometric method previously described (Icgen et al., 157(8) Res. Microbiol. 784-91 (2006)) with minor modifications. Sulfate was precipitated in hydrochloric acid medium with barium chloride to form insoluble barium sulfate crystals. A modified conditioning reagent contained, per liter: glycerol (104.16 mL), concentrated hydrochloric acid (60.25 mL), and 95% isopropyl alcohol (208.33 mL). For each reaction 2.0 mL of cell free supernatant was diluted 1:50 with ultrapure water in a 250 mL conical flask and 5.0 mL of conditioning reagent was added. The suspension was mixed well through stirring. Approximately 1 g, of barium chloride crystals was added and stirring was continued for 1.0 min. The mixture was allowed to settle for 2.0 min before the turbidity was measured spectrophotometrically at 420 nm. The sulfate concentration was determined from a standard curve prepared with standards ranging from 0-40 ppm of $Na_2SO_4$.

Results: LAB strains 10 and 12 supported soluble sulfate reduction at levels comparable to that of a commercial lactic acid control, despite the fact that the commercial substrate was added to a final concentration twice that achieved by the LAB strains (Table 2). LAB strain 2 did not support any sulfate reduction despite achieving levels of lactic acid comparable to strains 10 and 12 (Table 2).

TABLE 2

Efficiency of soluble sulfate reduction by SRB supported by LAB isolates.

| LAB Strain | Concentration of lactic acid in SRB medium (mM) | % of sulfate reduced |
|---|---|---|
| 2 (SRCac.01) | 1.72 | No reduction |
| 10 (SRClr.01) | 1.72 | 15.78 |
| 12 (SRCkk.01) | 1.72 | 17.46 |
| Commercial lactic acid | 3.52 | 21.05 |

Based on these results, strain 12 was selected for detailed characterization using standard microbiological, biochemical, and molecular biological methods. Strain 12 was also selected because it was incapable of growth in the SRB media, thus ensuring that no cross contamination of the SRB bioreactor would occur from free-floating cells inadvertently released from the LAB bioreactor.

C. Characterization of LAB Strain 12 (SRCkk.01)

LAB strain 12 was characterized using standard microbiological, biochemical, and molecular biological methods (Table 3). The profile of the strain does not match that of any previously reported strain.

TABLE 3

Characterization of LAB strain 12.

| Gram Nature | Source | DNase | Oxidase | Catalase | Lecithinase | Protease | Lipase | Flagella |
|---|---|---|---|---|---|---|---|---|
| +ve coccus | Intestine of Gibelion catla | −ve | +ve | −ve | −ve | −ve | −ve | absent |

| Temp range and Optimum | pH range and Optimum | Antibiotics | | | Molecular Identity |
|---|---|---|---|---|---|
| | | S | I | R | |
| 20 to 37° C., 20° C. | 2 to 10, 6-7.5 | C, A10, Ro, Cx | Cq, Tr, Nx10, Va30, Ce30 | T30, Do, Cf5, Mt, R, Ca30, G10, Pb, N | Maximal identity with Bacillus sp. GQ979935 |

Abbreviations:
S—Sensitive, I—Intermediate, R—Resistant
Do: Doxycycline; R15: Rifampicin; A10: Ampicillin; G10: Gentamicin; Ro30: Roxithromycin; Cq30: Cepadroxil; Mt4: Metoniclazole; Tr30: Trymethoprin; C30: Chloramphenicol; T30: Tetracycline; Va30: Vancomycin; Cloxacillin; Cx30; N30: Neomycin; Cephotaxime; Ce30; Nx10: Norfloxacin; Ca30: Cettazidime; Pb100: Polymycin; Cf5: Ciprofloxamne

Example 2

Comparison of Lactic Acid Production by Lab in Three Different Bioreactor Designs Summary: Three bioreactor designs were compared with respect to lactic acid production using LAB strain 12 (described above).

A. Bioreactor Designs

Three bioreactor designs were compared with respect to the efficiency of lactic acid production by LAB. The bioreactors were constructed of acrylic according to the specifications given in Table 4.

TABLE 4

| Reactor Specifications | | |
|---|---|---|
| A. Cylinder | B. Corrugated Asbestos Sheet | C. Cuboidal |
| Dimensions: 6 × 27.5 cm | Dimensions: 18 × 12 × 26 cm Length of pipe: 11 cm | Dimensions: 17 × 11 × 28.3 cm |
| Matrix: 50 gm hay | Diameter of pipe: 1.5 cm | Matrix: 460 gm hay |

B. Lactic Acid Production

LAB strain 12 was grown in each of the three bioreactor designs. For the cylindrical and cuboidal designs, hay was used as the matrix material (Table. 5). A 1% LAB inoculum was used for each bioreactor. Bacteria were grown in LB media with 1% dextrose. Lactic acid was measured 24, 36, 48, and 60 hours after inoculation using a modified method of Barker and Summerson, (1941) (described above).

Results: The cuboidal bioreactor design displayed substantially higher levels of lactic acid design at all time points than the cylinder and corrugated sheet designs (Table 5).

TABLE 5

Production of lactic acid by LAB in three different bioreactor designs.

| Reactor Type | Volume | Matrix Material | 24 hrs | | 36 hrs | | 48 hrs | | 60 hrs | |
|---|---|---|---|---|---|---|---|---|---|---|
| | | | mean | | mean | | mean | | mean | |
| Cylinder | 777.85 cm$^3$ | 50 g hay | 78.32 | 79.75 | 30.24 | 31.26 | | | | |
| | | | 84.28 | | 31.17 | | | | | |
| | | | 76.65 | | 32.39 | | | | | |
| Corrugated sheet | 5616 cm$^3$ | | 56.60 | 51.01 | 89.22 | 89.26 | 2.24 | 3.74 | 3.44 | 2.50 |
| | | | 49.93 | | 80.57 | | 4.17 | | 1.51 | |
| | 5329 cm$^3$ | | 46.50 | | 97.99 | | 4.81 | | 2.57 | |
| Cuboidal | | 460 g hay | 91.16 | 92.37 | 97.08 | 96.9 | 98.2 | 131.2 | 120.82 | 109.68 |
| | | | 93.94 | | 96.78 | | 154.6 | | 128.66 | |
| | | | 92.03 | | 96.84 | | 140.8 | | 79.57 | |

Equivalents

While certain embodiments have been illustrated and described, it should be understood that changes and modifications can be made therein in accordance with ordinary skill in the art without departing from the technology in its broader aspects as defined in the following claims.

The embodiments, illustratively described herein, may suitably be practiced in the absence of any element or elements, limitation or limitations, not specifically disclosed herein. Thus, for example, the terms "comprising," "including," "containing," etc., shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

The present disclosure is not to be limited in terms of the particular embodiments described in this application. Many modifications and variations can be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing, and enabling the same range being broken down into at least equal halves, thirds, quarters, fifths, tenths, etc. As a non-limiting example, each range discussed: herein can be readily broken down into a lower third, middle third and upper third, etc. As will also be understood by one skilled in the art, all language such as "up to," "at least," "greater than," "less than," and the like, include the number recited and refer to ranges which can be subsequently broken down into subranges as discussed above. Finally, as will be understood by one skilled in the art, a range includes each individual member.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A system comprising:
   a) a first chamber comprising a culture of lactic acid bacteria (LAB) immobilized on a first matrix; and
   b) a second chamber comprising a culture of sulfate-reducing bacteria (SRB) immobilized on a second matrix; wherein:
      the first chamber is in fluid communication with the second chamber;
      the first chamber is configured to receive a first culture medium alone or in combination with an environmental effluent and release a first discharge effluent to the second chamber;
      the second chamber is configured to receive the first discharge effluent alone or in combination with an environmental effluent and release a second discharge effluent;
      the environmental effluent comprises sulfate; and
      the second discharge effluent has a reduced sulfate concentration compared to the environmental effluent.

2. The system of claim 1, wherein the first culture medium comprises nutrients suitable for the growth, maintenance, or both of the lactic acid bacteria of the first chamber.

3. The system of claim 1, wherein the first discharge effluent comprises lactic acid at a higher concentration than in the first culture medium or environmental effluent.

4. The system of claim 1, wherein the second chamber comprises SRB culture media components suitable for the growth, maintenance, or both of the sulfate-reducing bacteria.

5. The system of claim 1, wherein the lactic acid bacteria are incapable of growth in the second chamber.

6. The system of claim 1, wherein the second discharge effluent has a sulfate concentration that is less than 90% of the sulfate concentration of the environmental effluent.

7. The system of claim 1, wherein the second discharge effluent has a sulfate concentration that is less than 1% of the sulfate concentration of the environmental effluent.

8. The system of claim 1, wherein the lactic acid bacteria comprise an indigenous strain of bacteria isolated from the intestine of species *Gibelion catla*, *Nibea* sp., *Labeo rohita*, *Raiamas bola*, *Puntius* sp., *Oreochromis niloticus*, *Heteropneutes fossilis*, *Sus scrofa domesticus*, *Gallus domesticus*, or *Capra aegagrus hircus*, or from fermented food, milk products, citrus and rotten fruit, leaves, or long grass.

9. The system of claim 1, wherein the sulfate-reducing bacteria comprise an indigenous consortium, comprising genera *Archaeoglobus*, *Desulfoarculus*, *Desulfobacter*, *Desulfobacterales*, *Desulfobacterium*, *Desulfobotulus*, *Desulfobulbus*, *Desulfococcus*, *Desulfomicrobium*, *Desulfomonile*, *Desulfonema*, *Desulfosarcina*, *Desulfotomaculum*, *Desulfovibrio*, *Desulfovibrionales*, *Syntrophobacterales*, *Thermodesulfobacterium*, or *Thermodesulfovibrio*.

10. The system of claim 1, wherein the lactic acid bacteria or the sulfate-reducing bacteria comprise pure populations of bacteria.

11. The system of claim 1, wherein the lactic acid bacteria or the sulfate-reducing bacteria comprise mixed populations of bacteria.

12. The system of claim 1, wherein the first matrix, second matrix, or both the first and second matrix, comprises a natural, synthetic, or semi-synthetic material.

13. The system of claim 1, wherein the first matrix, second matrix, or both the first matrix and second matrix, comprises hay, straw, husk, saw dust, wheat bran, rice bran, pulse bran, wood chips, plastic sheets, plastic o-rings, metal mesh, fiber mesh, alginate beads, or synthetic asbestos.

14. The system of claim 1, wherein the first chamber and/or the second chamber comprise a cylinder.

15. The system of claim 1, wherein the first chamber and/or the second chamber comprise a cube.

16. The system of claim 1, wherein the first chamber and/or the second chamber comprise a corrugated sheet.

17. A method for removing sulfates from an environmental effluent, the method comprising:
   a) directing a first culture media alone or in combination with an environmental effluent comprising sulfates to a first chamber comprising a culture of lactic acid bacteria (LAB) immobilized on a first matrix, wherein the lactic acid bacteria metabolize components of the culture medium and/or environmental effluent and produce lactic acid, and wherein the first chamber releases a first discharge effluent;
   b) directing the first discharge effluent from the first chamber alone or in combination with an environmental effluent to a second chamber comprising a culture of sulfate-reducing bacteria (SRB) immobilized on a second matrix, wherein the sulfate-reducing bacteria metabolize the lactic acid present in the first discharge effluent and reduce sulfates present in the first discharge effluent and/or environmental effluent to produce a second discharge effluent; and
   c) releasing the second discharge effluent from the second chamber, wherein the second discharge effluent comprises a reduced sulfate concentration compared to the environmental effluent.

18. The method of claim 17, wherein the second chamber comprises SRB culture media components suitable for the growth, maintenance, or both of the sulfate-reducing bacteria in addition to the first discharge effluent.

19. The method of claim 17, wherein the lactic acid bacteria are incapable of growth under the conditions maintained in the second chamber.

20. The method of claim 17, wherein the lactic acid bacteria and the sulfate-reducing bacteria are pure populations of bacteria.

21. The method of claim 17, wherein the lactic acid bacteria and the sulfate-reducing bacteria are mixed populations of bacteria.

22. A system for bioremediation of sulfates in an environmental effluent, comprising:
   a) a first chamber comprising a culture of lactic acid bacteria (LAB) immobilized on a first matrix; and
   b) a second chamber comprising a culture of sulfate-reducing bacteria (SRB) immobilized on a second matrix; wherein:
      the first chamber is in fluid communication with the second chamber;
      the first chamber is configured to receive a first culture medium alone or in combination with an environmental effluent comprising sulfate and direct a first discharge effluent to the second chamber;

the second chamber is configured to receive the first discharge effluent alone or in combination with an environmental effluent comprising sulfate and release a second discharge effluent, and the second discharge effluent comprises a reduced sulfate concentration compared to the environmental effluent.

23. The system of claim 22, wherein the first culture medium comprises nutrients suitable for the growth, maintenance, or both of the lactic acid bacteria.

24. The system of claim 22, wherein the first discharge effluent comprises lactic acid at a higher concentration than in the first culture medium or environmental effluent.

25. The system of claim 22, wherein the second chamber comprises SRB culture media components suitable for the growth, maintenance, or both of the sulfate-reducing bacteria.

26. The system of claim 22, wherein the lactic acid bacteria are incapable of growth under the conditions maintained in the second chamber.

27. The system of claim 22, wherein the second discharge effluent has a sulfate concentration that is less than 90% of the sulfate concentration of the environmental effluent.

28. The system of claim 22, wherein the second discharge effluent has a sulfate concentration that is less than 1% of the sulfate concentration of the environmental effluent.

29. The system of claim 22, wherein the lactic acid bacteria comprise an indigenous strain of bacteria isolated from the intestine of species *Gibelion catla*, *Nibea* sp., *Labeo rohita*, *Raiamas bola*, *Puntius* sp., *Oreochromis niloticus*, *Heteropneutes fossilis*, *Sus scrofa domesticus*, *Gallus domesticus*, or *Capra aegagrus hircus*, or from fermented food, milk products, citrus and rotten fruit, leaves, or long grass.

30. The system of claim 22, wherein the sulfate-reducing bacteria comprise an indigenous consortium, comprising genera *Archaeoglobus, Desulfoarculus, Desulfobacter, Desulfobacterales, Desulfobacterium, Desulfobotulus, Desulfobulbus, Desulfococcus, Desulfomicrobium, Desulfomonile, Desulfonema, Desulfosarcina, Desulfotomaculum, Desulfovibrio, Desulfovibrionales, Syntrophobacterales, Thermodesulfobacterium, Thermodesulfovibrio*.

31. The system of claim 22, wherein the lactic acid bacteria or the sulfate-reducing bacteria comprise pure populations of bacteria.

32. The system of claim 22, wherein the lactic acid bacteria or the sulfate-reducing bacteria comprise mixed populations of bacteria.

33. The system of claim 22, wherein the first matrix, second matrix, or both the first matrix and second matrix, comprises a natural, synthetic, or semi-synthetic material.

34. The system of claim 22, wherein the first matrix, second matrix, or both the first matrix and second matrix, comprises hay, straw, husk, saw dust, wheat bran, rice bran, pulse bran, wood chips, plastic sheets, plastic o-rings, metal mesh, fiber mesh, alginate beads, or synthetic asbestos.

35. The system of claim 22, wherein the first chamber and/or the second chamber comprise a cylinder.

36. The system of claim 22, wherein the first chamber and/or the second chamber comprise a cube.

37. The system of claim 22, wherein the first chamber and/or the second chamber comprise a corrugated sheet.

* * * * *

UNITED STATES PATENT AND TRADEMARK OFFICE
CERTIFICATE OF CORRECTION

PATENT NO.         : 8,398,856 B2  
APPLICATION NO.    : 13/380767  
DATED              : March 19, 2013  
INVENTOR(S)        : Chaudhuri et al.

Page 1 of 2

It is certified that error appears in the above-identified patent and that said Letters Patent is hereby corrected as shown below:

On Title Page 2, Item (56), under "OTHER PUBLICATIONS", in Column 2, Line 37, delete ""​. Isolation," and insert -- "Isolation, --, therefor.

In the Specifications

In Column 1, Line 56, delete "bacterial" and insert -- bacteria --, therefor.

In Column 3, Line 29, delete "Heteropneutes" and insert -- Heteropneustes --, therefor at each occurrence throughout the Patent.

In Column 3, Line 35, delete "Desulfobotulus," and insert -- Desulfobulbus, --, therefor at each occurrence throughout the Patent.

In Column 4, Line 50, delete "contaminants" and insert -- contaminants. --, therefor.

In Column 5, Line 32, delete "Sammhmg von Mikroorganismen and" and insert -- Sammlung von Mikroorganismen und --, therefor.

In Column 6, Line 7, delete "the that of the" and insert -- the --, therefor.

In Column 6, Line 22, delete "Bakelite" and insert -- bakelite --, therefor.

In Column 7, Line 6, delete "then" and insert -- than --, therefor.

In Column 8, Line 2, delete "homofermentive" and insert -- homofermentative --, therefor.

In Column 8, Line 20, delete "homofermentive" and insert -- homofermentative --, therefor.

In Column 8, Line 33, delete "fossils," and insert -- fossilis, --, therefor.

Signed and Sealed this  
Eleventh Day of June, 2013

Teresa Stanek Rea  
*Acting Director of the United States Patent and Trademark Office*

CERTIFICATE OF CORRECTION (continued)
U.S. Pat. No. 8,398,856 B2

In Column 9, Line 29, delete "Themmodesulfobacterium," and insert -- Thermodesulfobacterium, --, therefor.

In Column 9, Line 49, delete "and" and insert -- und --, therefor.

In Column 11, Line 61, delete "calla" and insert -- catla --, therefor.

In Column 11, Line 64, delete "chili" and insert -- chilli --, therefor.

In Column 12, Line 51, delete "through out" and insert -- throughout --, therefor.

In Column 13, Line 48, delete "turbidometric" and insert -- turbidimetric --, therefor.

In Column 14, Line 10, delete "1 g," and insert -- lg --, therefor.

In Column 16, Line 65, delete "describing," and insert -- describing --, therefor.

In Column 16, Line 67, delete "discussed:" and insert -- discussed --, therefor.